United States Patent [19]

Eddy

[11] Patent Number: 4,488,400
[45] Date of Patent: Dec. 18, 1984

[54] POSITIVE DISPLACEMENT AIR DELIVERY SYSTEM FOR AN INTERNAL COMBUSTION ENGINE

[75] Inventor: William C. Eddy, West Bloomfield, Mich.

[73] Assignee: The Bendix Corporation, Southfield, Mich.

[21] Appl. No.: 481,609

[22] Filed: Apr. 4, 1983

[51] Int. Cl.³ .............................................. F01N 3/22
[52] U.S. Cl. ............................................ 60/274; 60/277; 60/285; 60/290; 123/559
[58] Field of Search ................ 60/274, 285, 290, 277; 123/559

[56] References Cited

U.S. PATENT DOCUMENTS

| | | | |
|---|---|---|---|
| 3,307,487 | 3/1967 | Steadman | 103/117 |
| 3,937,605 | 2/1976 | Karpisek | 418/219 |
| 3,946,565 | 3/1976 | Cutler | 60/599 |
| 4,004,556 | 1/1977 | Pfeiffer | 123/8.45 |
| 4,026,106 | 5/1977 | Tamazawa | 60/277 |
| 4,083,183 | 4/1978 | Yaegashi | 60/290 |
| 4,364,366 | 12/1982 | Terwilliger | 123/564 |
| 4,364,367 | 12/1982 | Terwilliger | 123/564 |

FOREIGN PATENT DOCUMENTS 105520  7/1982  Japan ............................ 60/290

Primary Examiner—Douglas Hart
Attorney, Agent, or Firm—James R. Ignatowski; Russel C. Wells

[57] ABSTRACT

A positive displacement air delivery system for an internal combustion engine having a multiple chamber positive displacement air pump and a control valve for directing the output of the air pump to either the engine's catalytic converter or to the engine's air intake for supercharging the engine. The control valve interconnects the individual input and output ports of the air pumps chamber in a predetermined arrangement for optimum efficiency of the pump under the various operational modes of the engine.

29 Claims, 4 Drawing Figures

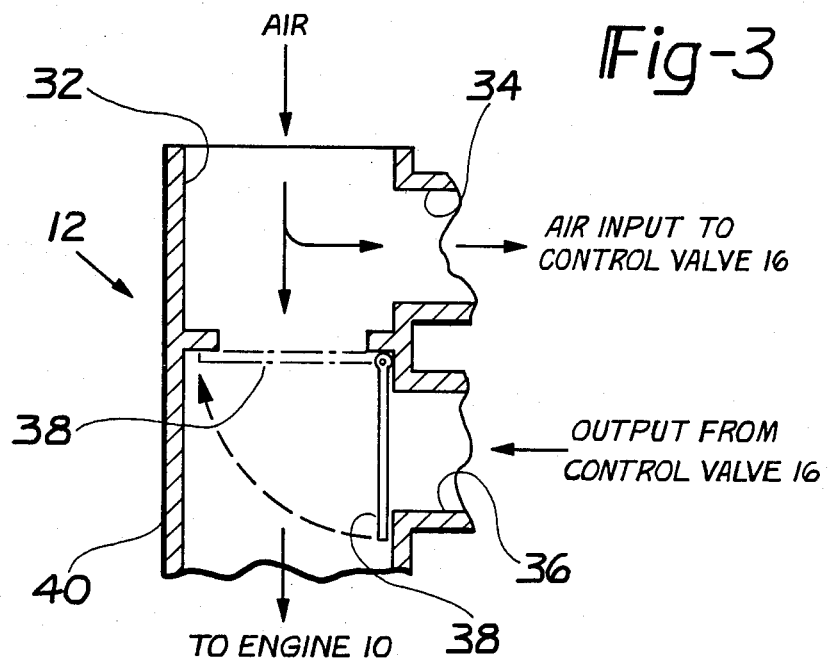
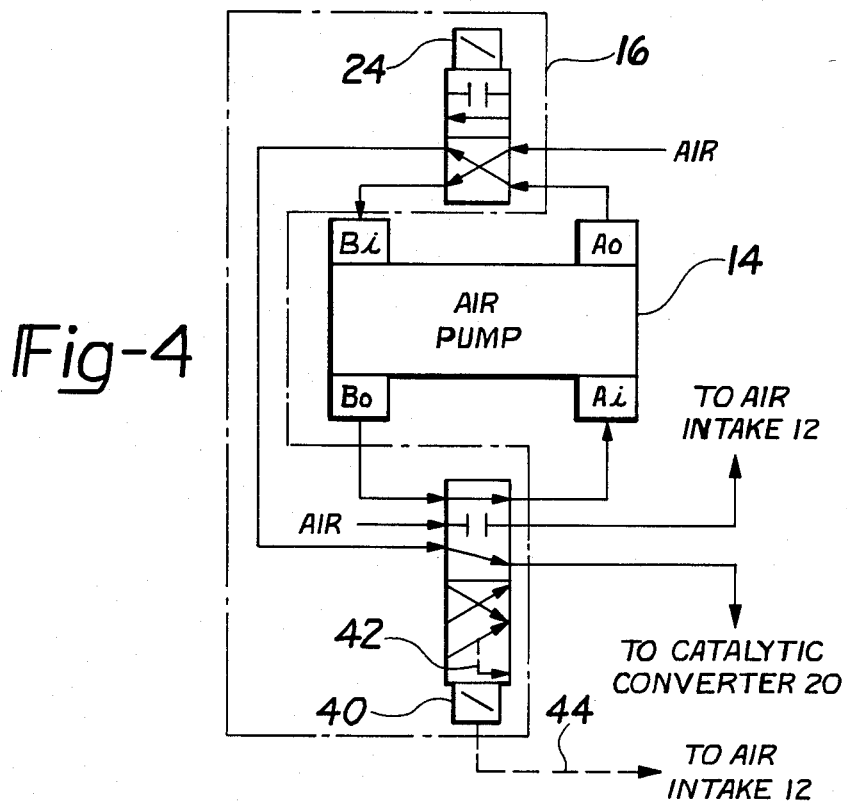

POSITIVE DISPLACEMENT AIR DELIVERY SYSTEM FOR AN INTERNAL COMBUSTION ENGINE

BACKGROUND OF THE INVENTION

1. Field of the Invention

The invention is related to air delivery systems for internal combustion engines and in particular an air delivery system for providing auxiliary air to a catalytic converter and auxiliary air for on demand supercharging the engine to increase its torque output.

2. Prior Art

Separate air delivery systems for providing auxiliary air for the efficient operation of a catalytic converter and for periodically supercharging the engine to increase its torque output are known in the art. Separate pumps are conventionally used because there is a substantial difference in the quantity of air needed to be delivered. Normally a continuously operating air compressor is used to provide auxiliary air to the catalytic converter while a larger air compressor is used to supercharge the engine. The larger air compressor may be turbo driven by the exhaust gases, may be electrically driven, or may be mechanically driven from a rotating member of the engine, such as described by Casey et al in U.S. Pat. No. 4,350,135. In the engine driven supercharging systems, a clutch is provided between the engine's power takeoff and the air compressor so that the air compressor is only activated when there is a need to supercharge the engine. In a like manner, it is not always necessary or desirable to supply auxiliary air to the catalytic converter. A magnetic clutch to disconnect the air pump supplying auxiliary air to the catalytic converter would provide a more efficient arrangement, but its use has been rejected by the industry as too costly.

The invention is a control valve which controls the output of a single continuously driven air compressor permitting it to provide for the delivery of auxiliary air to the catalytic converter and for periodic supercharging of the engine as required.

BRIEF DESCRIPTION OF THE FIGURES

FIG. 3 is a cross sectional view of the engine's intake.

FIG. 4 is a pneumatic circuit diagram of an alternate embodiment of the control valve.

SUMMARY OF THE INVENTION

The invention is an air delivery system having a multiple chamber positive displacement air pump continuously driven from a rotary output of the engine and a control valve for interconnecting the individual input and output ports of the air pump to supply auxiliary air to the catalytic converter, in response to a first signal, terminate the air flow to catalytic converter in response to a second signal and supercharging the engine in response to a third signal. The interconnections between the various input and output ports are made in such a manner so as to optimize the efficiency of the air delivery system in all three modes of operation.

One advantage of the air delivery system is that a single continuously driven air pump is capable of providing auxiliary air to the catalytic converter and supercharging the engine. Another advantage of the air delivery system is that the input and output ports of the pump are interconnected for efficient operation of the air pump in all three modes of operation. These and other advantages of the air delivery system will become more apparent from a reading of the detailed description in conjunction with the drawings.

DETAILED DESCRIPTION OF THE INVENTION

Figure 1:
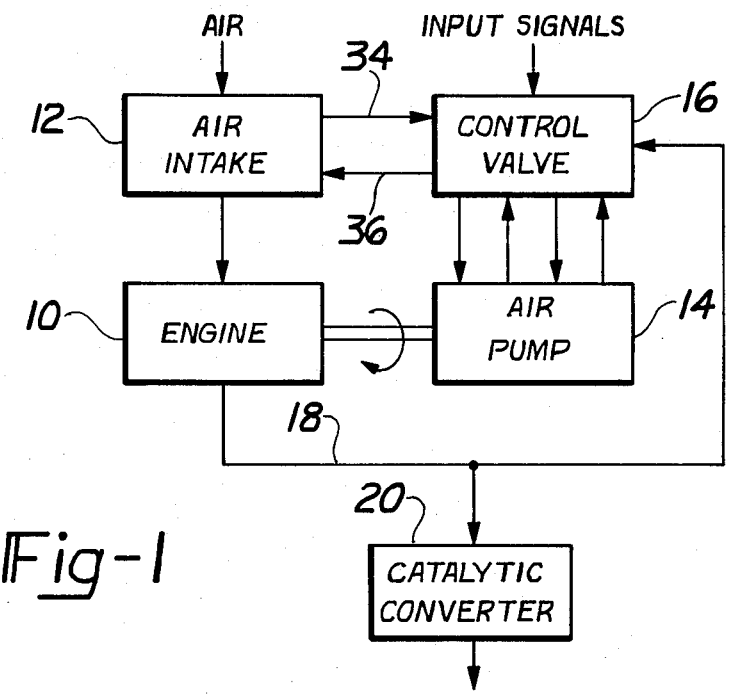
FIG. 1 is a block diagram of the air delivery system.

Referring to FIG. 1 there is shown an internal combustion Engine 10 which under normal driving conditions receives atmospheric air through an Air Intake Device 12. The Air Intake Device 12 may be a carburetor, throttle body or any other device as is known in the art. The Engine 10 is presumed to include an air filter (not shown) which removes any particulate matter before it enters the Air Intake Device 12 as is known.

A multiple chamber positive displacement Rotary Air Pump 14 is mechanically driven from a rotary output member of the Engine 10. Preferably the Air Pump 14 is continuously belt driven from a power takeoff at the front of the Engine in a manner similar to that used to drive the alternator or the hydraulic pump for power steering or power brake systems. The air inputs to and air output from the rotary Air Pump 14 are controlled by a Control Valve 16 to provide air to the engine's Catalytic Converter 20 via the Exhaust Manifold 18 or provide pressurized air to the Air Intake Device 12 to supercharge the Engine increasing its output torque under high load conditions. The input to and output from Air Pump 14 are controlled in response to electrical or pneumatic signals generated in response to the operational parameters of the Engine 10.

These signals may be electrical signals generated by a microprocessor computing the engine's fuel and/or timing requirements or by special purpose electronic circuits receiving sensor inputs as is known in the art. Alternatively, the signal may be pneumatic signals generated in a known way from the electrical signals or derived elsewhere from the Engine and/or its accessories. Basically the signals represent three different engine operating modes:

1. Normal operation of the Engine 10 which requires a predetermined quantity of auxiliary air to be provided to the catalytic converter;
2. A hot catalytic converter which requires a reduction in the auxiliary air being supplied to the catalytic converter; and
3. High engine loads requiring the Engine 10 to be supercharged.

Figure 2:
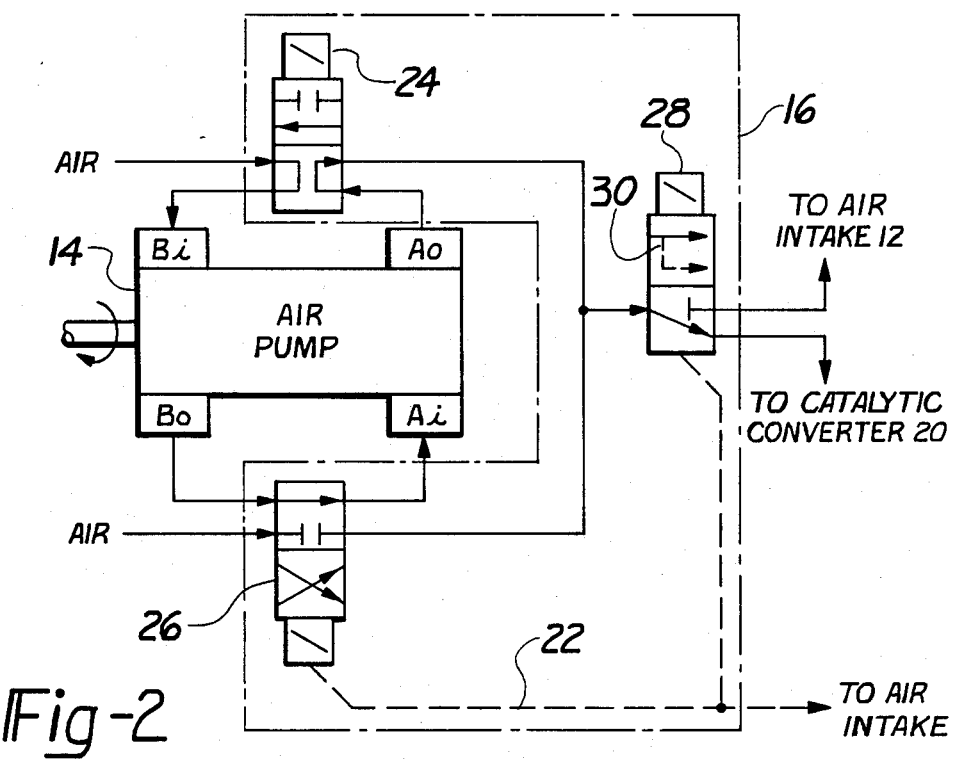
FIG. 2 is a pneumatic circuit diagram of the control valve.

The structure and operation of Control Valve 16 will first be explained with reference to the pneumatic circuit shown on FIG. 2. Referring to FIG. 2, a positive displacement air pump such as that disclosed by Steadman in U.S. Pat. No. 3,307,487 has at least two pumping chambers. For convenience it is assumed the Air Pump 14 has two pumping chambers designated as Chambers A and B. Chamber A has an input port designated $A_i$ and an output port designated as $A_o$. In a like manner Chamber B has an input port $B_i$ and an output port $B_o$. The input port $B_i$ of Chamber B and the output port $A_o$ of Chamber B are connected to a Valve 24 as shown in FIG. 2. In a like manner the output port $B_o$ of Chamber B and the input port $A_i$ of Chamber A are connected to a Valve 26.

Valves 24 and 26 are two position pneumatic or solenoid actuated valves. In its first position, Valve 24 interconnects the output port $A_o$ of Chamber A with the input to a third Valve 28, and the input port $B_i$ of chamber B is connected to a source of air through Air Intake Device 12. Valve 26 in its first position interconnects the input port $A_i$ of Chamber A with the output port $B_o$ of Chamber B.

Valve 24 in its second position interconnects the input port $B_i$ of Chamber B with the output port $A_o$ of Chamber A. Valve 26 in its second position interconnects the input port $A_i$ of Chamber A to a source of air at atmospheric pressure and interconnects the output port $B_o$ of Chamber B to the input of Valve 28.

Valve 28 is also a two position pneumatic or solenoid actuated valve having a first position as shown in FIG. 2 connecting the outputs of Valves 24 and 26 to the Catalytic Converter 20 through the Exhaust Manifold 18 and a second position connecting the outputs of the Valves 24 and 26 to the Air Intake Device 12. Valve 28 in its second position may also include a bleed line connected to the Exhaust Manifold output as indicated by dashed line 30.

The Valves 24, and 26 may be individually activated to go from their first position to their second position in response to the control signals. Valves 26 and 28 may be electrically or mechanically linked as indicated by dashed line 22 so that they go from their first position to the second positions together.

The operation of the Control Valve 16 is as follows.

In response to a first signal indicative of normal operation of the Engine, Valves 24, 26, and 28 are in their unactivated or first state as shown on FIG. 2. In this state, atmospheric air is pumped from Chamber B to Chamber A then to the Catalytic Converter 20 via Valve 28.

A second signal, indicative of hot Catalytic Converter switches the Valve 24 from its first position to its second position and leaves Valves 26 and 28 in their first position. In this state the output ports $A_o$ and $B_o$ are cross connected to the input ports $B_i$ and $A_i$ respectively. With this arrangement there is no air input to the Exhaust Manifold through Valve 28. Instead the air is trapped in the Pump 14 and recirculated back and forth between the two chambers with only frictional losses.

Under heavy load conditions when it is desirable to increase the torque output of the Engine, a third signal activates Valve 24 to its first position while Valves 26 and 28 are actuated to their second position switching the input ports $A_i$ and $B_i$ to the external source of air. Simultaneously the output ports $A_o$ and $B_o$ are directed to the Air Intake Device 12 through Valves 24, 26 and 28, effectively supercharging the Engine 10. The air bleed, illustrated by dashed line 30 may be used to provide auxiliary air to the Catalytic Converter when the Valve 28 is in its second position and the Engine is being supercharged. It is recognized that the air bleed 30 may be eliminated from Valve 28 and an external air bleed provided between the two outputs of Valve 28.

The Air Intake Device 12 may be of any conventional design, such as that shown in FIG. 3. The Air Intake Device has a housing 40 defining a throughput passageway 32 interconnecting the Engine 10 with a source of air at atmospheric pressure through a filtering device (not shown). The housing 40 also includes an air feed passageway 34 for transmitting air from throughput passageway 32 to the "AIR" input ports of Control Valve 16 and a return passageway 36 interconnecting the output of Control Valve 16 back to throughput passageway 32 for supercharging the Engine. A flapper valve member 38 is normally biased over end of return passageway 36. When Valves 26 and 28 are actuated to their second position, the increased pressure of the air flow from Air Pump 14 through Valve 28 rotates valve member 38 to occlude throughput passageway 32 between air feed passageway 34 and return passageway 36 as indicated in phantom in FIG. 3. In this state, air flow through Air Intake Device 12 is directed to the input ports $A_i$ and $B_i$ of Air Pump 14 through air passageway 32 and Valves 24 and 26 and the output ports $A_o$ and $B_o$ of Air Pump 14 are connected to the Engine 10 through Valve 28, return passageway 36 and the portion of the throughput passageway 32 below flapper valve member 38. As is known in the art, the structure of Air Intake Device 12 may take many other forms. For example, air intake passageway 32 may be omitted and the "AIR" inputs to Valves 24 and 26 may receive air at atmospheric pressure from an independent filtered source. In other known configurations, flapper valve 38 may be mechanically or electrically rotated to occlude throughput passageway 32 with the actuation of Valves 26 and/or 28. The configuration of the Air Intake Device 12 is considered to be a design choice and does not constitute part of this invention.

An alternate configuration of the Control Valve 16 is illustrated in FIG. 4. In this configuration Valve 24 is functionally the same as shown in the pneumatic diagram of FIG. 2. However, Valves 26 and 28 are combined into a single Valve 40. Valve 40 has three input ports receiving respectively the output from the output port $B_o$ of Air Pump 14, air at atmospheric pressure from air input passageway 34 or in independent filtered air source and output of output port $A_i$ from Valve 24. Valve 40 also has three output ports, one connected to the intake port $A_o$ of Air Pump 14, the second connected to the return passageway 36 of the Air Intake Device 12 and the third connected to the Catalytic Converter 20 through the Exhaust Manifold 18. In its unactivated or first position as shown in FIG. 4, Valve 40 interconnects the output port $B_o$ of Chamber B with the input port $A_i$ to Chamber A of Air Pump 14, and connects the output port $A_o$ to the Catalytic Converter 20 via Valve 24. In its activated or second position, Valve 40 connects the output ports $A_o$ and $B_o$ to the Air Intake 12 through return passageway 36 and connects the intake port $A_i$ to the source of air at atmospheric pressure. A bleed as indicated by dashed arrow 42 may be added to Valve 40 to permit a positive air flow to the Catalytic Converter 20 when Valve 40 is activated to supercharge the Engine. Dashed arrow 44 indicates an electrical or mechanical link between Valve 40 and flapper valve member 38 in the Air Intake 12 when it is desirable to place flapper valve 38 in its second portion occluding throughput passageway 32 with the actuation of Valve 40.

It is recognized that those skilled in the art may combine the functions of Valves 24, 26 and 28 of FIG. 2 or Valves 24 and 40 of FIG. 4 into a single multiple position solenoid or pneumatically actuated valve within the spirit of the invention.

It is not intended that the invention be limited to the pneumatic circuits or valve arrangements illustrated and discussed herein nor is it limited to only dual chamber positive displacement pumps. Those skilled in the art will be able to make physical changes without departing from the spirit of the invention as describe and set forth in the appended claims.

What is claimed is:

1. A positive displacement air delivery system for an internal combustion engine having an air intake supplying air to the engine, a catalytic converter, means for generating signals indicative of the operational state of said engine, and the catalytic converter, said air delivering system characterized by:

a positive displacement dual chamber rotary air pump mechanically driven by a rotary member of the engine, said air pump having a first pumping chamber having a first input port and a first output port and a second pumping chamber having a second input port and a second output port; and valve means interconnected with said first and second input ports and said first and second output ports, said valve means having a first state in response to a first signal connecting the air output from at least one of said first and second pumping chambers to the catalytic converter, a second state in response to a second signal terminating the connection of the air output from said at least one pumping chamber to the catalytic converter and a third state in response to a third signal connecting the air output from said first and second chambers to the air intake supercharging the engine.

2. The air delivery system of claim 1 wherein said valve means in said first state connects said first input port to a source of ambient air, connects said second output port to said catalytic converter and interconnects said first output port with said second input port, in said second state said valve means connects said first input port with said second output port and interconnects said first output port with said second input port, and in said third state said valve means connects said first and second input ports to the source of ambient air and connects said first and second output ports to the air intake device.

3. The air delivery system of claim 1 further including means for bleeding a predetermined quantity of air to said catalytic converter when said valve means is in said third state.

4. The air delivery system of claim 2 wherein said valve means comprises:

a first valve having a first state in response to said first signal connecting said first input port to a source of ambient air and connecting said second output port to an input of a third solenoid valve and a second state in response to said second signal interconnecting said second output port with said first input port;

a second valve having a first state in response to said first and second signals interconnecting said first output port to said second input port and a second state in response to said third signal connecting said second input port to a source of ambient air and connecting said first output port to said input of said third solenoid valve; and said third valve having a first state in response to at least said first signal connecting the outputs of said first and second valves to said catalytic converter and a second state in response to said third signal connecting the outputs from said first and second valves to the air intake manifold.

5. The air delivery system of claim 4 wherein said first, second and third valves are solenoid actuated valves.

6. The air delivery system of claim 4 wherein said first, second and third valves are pneumatically actuated valves.

7. The air delivery system of claim 2 wherein said valve means comprises:

a first valve having a first state in response to said first signal connecting said first input port to a source of ambient air and connecting said second output port to an input of a second valve, and a second state in response to said second signal interconnecting said first input port with said second output port; and said second valve having a first state in response to said first and second signals connecting said first output port with said second input port; and connecting said input to the catalytic converter and a second state in response to said third signal connecting said second input port to a source of ambient air, and connecting said first output port and said input to the air intake supercharging the engine.

8. The air delivery system of claim 7 wherein said second valve in said second state further interconnects an air bleed passage to the catalytic converter.

9. The air delivery system of claim 7 further including an air bleed passage external to said second valve interconnecting the output of said second valve connected to the catalytic converter and the air intake device.

10. The air delivery system of claim 8 wherein said first and second valves are solenoid actuated valves.

11. The air delivery system of claim 8 wherein said first and second valves are pneumatic actuated valves.

12. A method for providing auxiliary air to a catalytic converter and air to supercharge an internal combustion engine having means for generating signals indicative of the operating parameters of the engine and the temperature of the catalytic converter, said method comprising the steps of:

continuously driving a rotary positive displacement air pump with a rotary output member of the engine, said air pump having at least a first pumping chamber having a first input port and a first output port and a second pumping chamber having a second input port and a second output port;

activating a control valve means with a first signal indicative of normal engine operation to connect the output port of one of said at least first and second pumping chambers to the catalytic converter;

activating said same control valve means with a second signal indicative of the catalytic converter exceeding a predetermined temperature to disconnect said one output port terminating the provision of air to the catalytic converter; and activating said same control valve means with a third signal indicative of the need to increase the torque output of the engine to connect the output ports of said at least first and second pumping chambers to an air intake providing air to the engine, the air outputs of said first and second chambers supercharging the engine to increase its torque output.

13. The method of claim 12 wherein said pump has two chambers said step of activating with said first signal comprises the steps of:

connecting said first input port to a source of ambient air;

interconnecting said first output port with said second input port; and connecting said second output port to said catalytic converter.

14. The method of claim 13 wherein said step of activating with said second signal comprises the steps of:

interconnecting said first input port with said second output port; and interconnecting said second input port with said first output port.

15. The method of claim 14 wherein said step of activating with said third signal comprises the steps of:

connecting said first and second input ports to a source of ambient air; and connecting said first and second output ports to said air intake.

16. The method of claim 13 wherein said step of activating with a first signal comprises the steps of:

activating a first valve to a first state connecting the first input port to a source of ambient air and connecting said second output port to a third valve;

activating a second valve to a first state interconnecting said first output port to said second input port; and activating said third valve to a first state interconnecting the output of the first valve to the catalytic converter.

17. The method of claim 16 wherein said step of activating with a second signal activates only said first valve to a second state interconnecting said first input port with said second output port and disconnection the connection between the second output port and the third valve.

18. The method of claim 17 wherein said step of activating with a third signal comprises the steps of:

activating said first valve to its first state;

activating said second valve to a second state connecting said second input port to a source of ambient air and connecting said first input port to said third valve; and activating said third valve to a second state connecting the outputs of said first and second valves to said air intake.

19. The method of claim 13 wherein said step of activating with a first signal comprises the steps of:

activating a first valve to a first state connecting the first input port to a source of ambient air and connecting said second output port to an input to a second valve; and activating said second valve to a first state interconnecting said first output port with said second input port and connecting said input to said second valve from said first valve to the catalytic converter.

20. The method of claim 19 wherein said step of activating with a second signal comprises the steps of:

activating said second valve to its first state; and activating said first valve to a second state interconnecting said first input port with said second output port and disconnecting said second output port from said second valve.

21. The method of claim 20 wherein said step of activating with a third signal comprises the steps of:

activating said first valve to its first state; and activating said second valve to a second state connecting said second input port to a source of air at ambient pressure, and connecting said first output port and said input to the air intake device.

22. The method of claims 18 or 21 further including the step of bleeding a portion of the air output from said first and second output ports to the catalytic converter.

23. The method of claim 12 wherein said step of activating with said first, second and third signals activates a three position valve.

24. The method of claim 19 wherein said means for generating control signals generates electrical signals, said first, second and third valves are solenoid actuated valves.

25. The method of claim 21 wherein said means for generating control signals generates electrical signals said first and second valves are solenoid actuated valves.

26. The method of claim 19 wherein said means for generating signals generates pneumatic signals said first, second and third valves a pneumatic actuated valves.

27. The method of claim 22 wherein said means for generating signals generates pneumatic signals said first and second signals are pneumatic actuated valves.

28. A positive displacement air delivery system for an internal combustion engine having an air intake, a catalytic converter, means for generating signals indicative of the operational state of said engine and the catalytic converter characterized by:

a positive displacement multi-chamber air pump mechanically driven by a rotary member of the engine, said air pump having at least a first pumping chamber having a first input port and a first output port and at least a second pumping chamber having a second input port and a second output port; and valve means interconnected with said input ports and said output ports, said valve means having a first state in response to a first signal connecting the output port of at least one of said pumping chambers to the catalytic converter, a second state in response to a second signal terminating the connection of output port from said at least one pumping chamber to the catalytic converter and a third state in response to a third signal connecting the air output from all of said chambers to the air intake device supercharging the engine.

29. The air delivery system of claim 28 wherein said valve means in said first state connects the input port of next sequential pumping chamber of said at least one pumping chamber to a source of ambient air, connects the output port of said at least one pumping chamber to the catalytic converter and interconnects sequentially the output ports of the preceding pumping chamber with the input port of the next sequential pumping chamber, said valve means in said second state, disconnects the output port of said at least one pumping chamber from said catalytic converter and interconnects the output port of said at least one pumping chamber with the input port of the next sequential pumping chamber, and said valve means in response to said third signal connects the input ports of all of said at least two pumping chambers to a source of ambient air and connects all of the output ports to said air intake.

* * * * *